Nov. 7, 1933.     A. MINER     1,934,136
LOCK FOR CONTAINERS
Filed Oct. 3, 1932     3 Sheets-Sheet 1
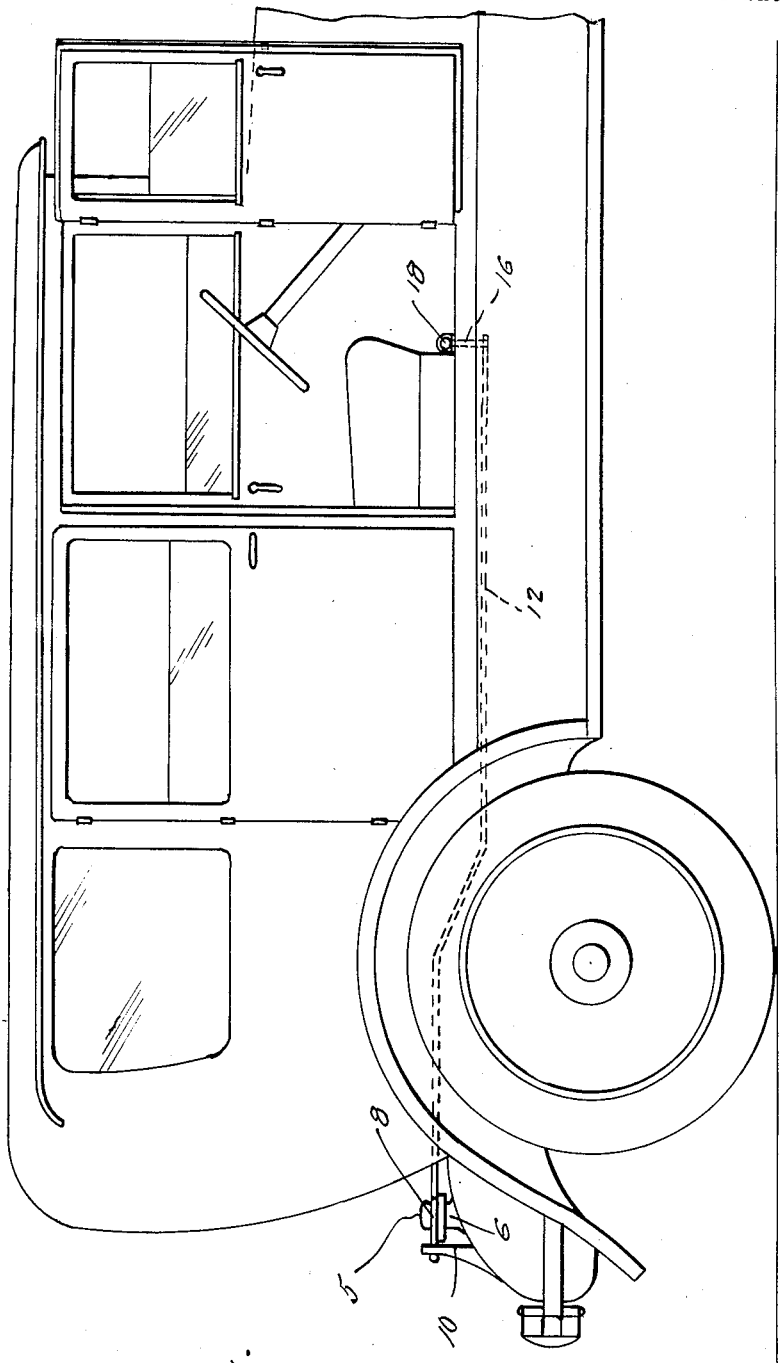
Inventor
Alfred Miner
By Clarence A O'Brien
Attorney Nov. 7, 1933.  A. MINER  1,934,136
LOCK FOR CONTAINERS
Filed Oct. 3, 1932  3 Sheets-Sheet 2
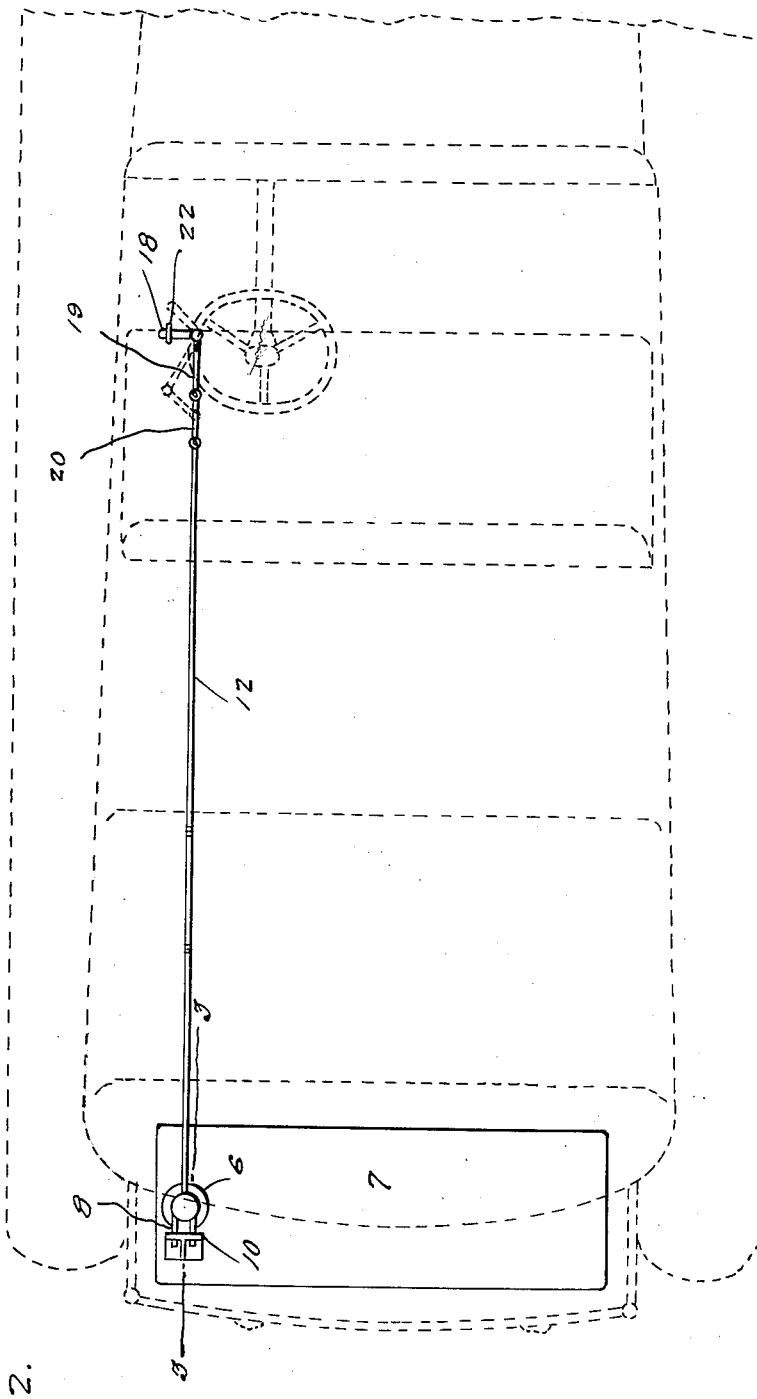
Inventor
Alfred Miner
By Clarence A. O'Brien
Attorney Nov. 7, 1933.   A. MINER   1,934,136
LOCK FOR CONTAINERS
Filed Oct. 3, 1932   3 Sheets-Sheet 3
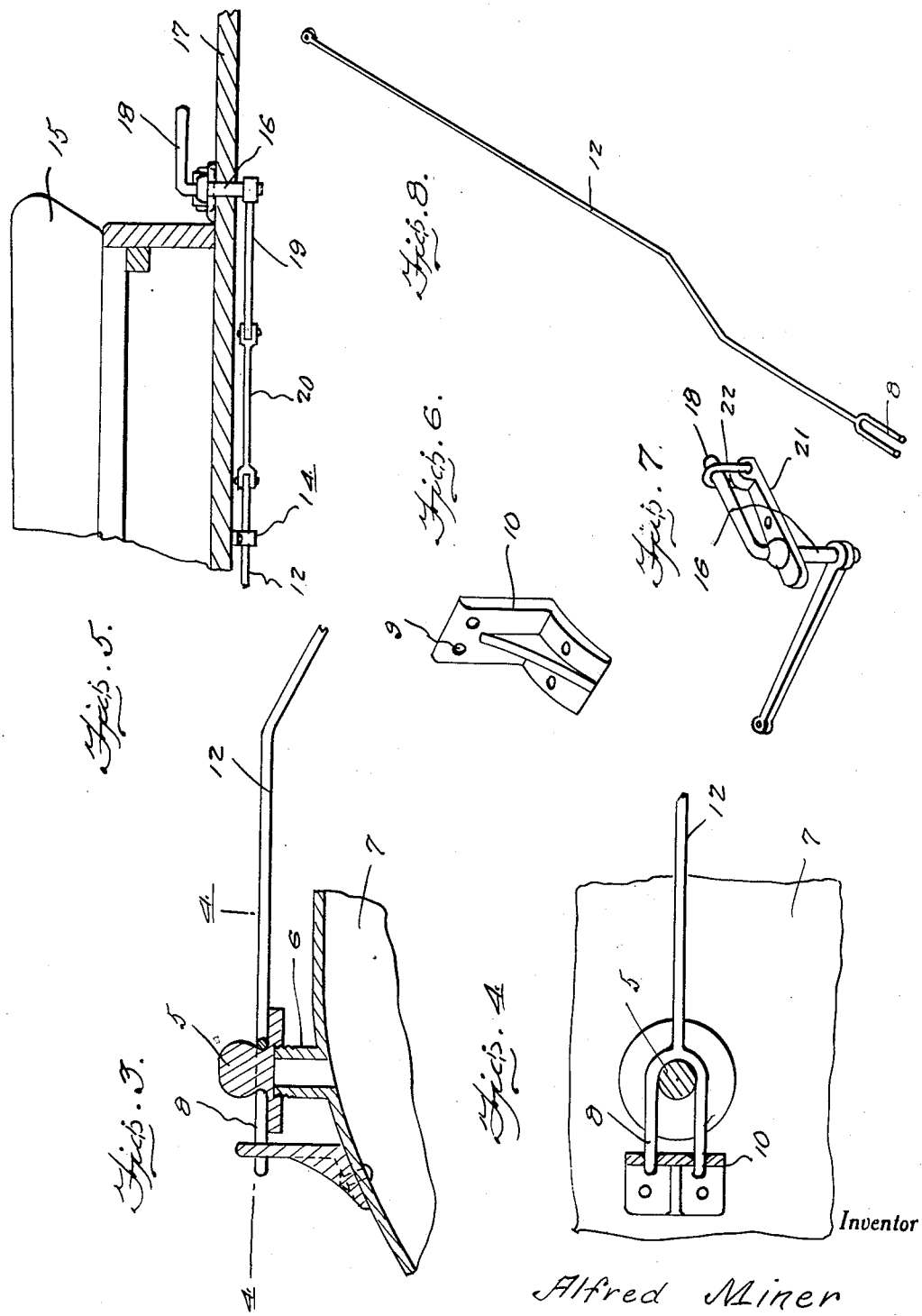
Inventor
Alfred Miner
By Clarence A. O'Brien
Attorney Patented Nov. 7, 1933

1,934,136

UNITED STATES PATENT OFFICE 1,934,136

LOCK FOR CONTAINERS

Alfred Miner, New York, N. Y.

Application October 3, 1932. Serial No. 636,081

1 Claim. (Cl. 220—55)

The present invention relates to improvements in lock caps for containers, such as the gasoline tank of automobiles and the like wherein a cap is threadedly or otherwise engaged in place.

The primary object of my invention is to provide an improved lock cap for gasoline tanks or other storage containers.

Another object is to provide an improved cap for containers having means for locking the same in place actuated from a remote position such as the driver's seat.

A further object is to provide an improved lock cap for containers provided with a lock mechanism to normally prevent removal of the cap and operable from a point remote from the cap to permit removal of the cap by an authorized person when desired.

Another very important object of the invention resides in the provision of this nature which is exceedingly simple in its construction, inexpensive to manufacture and install, easy to manipulate, convenient, thoroughly reliable in operation and use, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a fragmentary side elevation of an automobile showing an installation of my mechanism.

Figure 2 is a top plan view of the mechanism showing the automobile in dotted lines.

Figure 3 is a detail section taken substantially on the line 3—3 of Figure 2.

Figure 4 is a sectional view taken substantially on the line 4—4 of Figure 3.

Figure 5 is a detail sectional elevational view through a portion of the front part of the vehicle, showing the position of the operating crank when the device is in ineffective or released position.

Figure 6 is a perspective view of a bracket.

Figure 7 is a perspective view of the control lever, and

Figure 8 is a perspective view of the elongated link rod.

Referring to the drawings in detail it will be seen that numeral 5 denotes a cap for the filling neck 6 of a tank 7. Numeral 8 denotes a fork adapted to slidably straddle the narrow portion of the cap 5 and to protrude through apertures 9 in a bracket 10 fixed to the tank 7 for the purpose of holding the cap 5 securely in place. In other words the fork 8 will have to be moved forwardly in order that it may be released from the apertures of the bracket 10 and in such a position so that the cap 5 may be removed. The fork 8 is formed on an elongated link rod 12 suitably shaped and suitably slidably mounted in bearings 14 so that it terminates below and in front of the front or driver's seat 15 of the automobile.

A vertical shaft 16 is journalled in the floor board 17 in front of the seat 15 and at its upper end has an operating crank 18 and at its lower end has an operated crank 19 connected with the link 12 by another link 20. Obviously by swinging the crank 18 the fork 8 may be slid to a locking or release position with respect to the cap 5 and the bracket 10. A bracket 21 is mounted under the crank 18 and has a bail 22 which may be engaged with the crank to hold it in its locked position, by this I mean in a position so that the fork is in locked position with respect to the cap of the tank so as to prevent theft of the gasoline or the like.

It is thought that the construction, utility, operation and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing ony of its advantages.

Having thus described my invention, what I claim as new is:

In a motor vehicle including its fuel tank, a cap for the tank having a projection thereon, a bracket attached to a top part of the tank in rear of the cap and having a pair of holes therein, a link having a forked end, the prongs of which are adapted to receive the projection on the cap between them with the ends of the prongs fitting in the holes of the bracket, guiding means for the link attached to the body of the vehicle, a shaft journaled in a part of the front of the body and having a crank handle at its upper end, an arm connected to the lower end of the shaft, a link connecting the arm with the front end of the first mentioned link and means for locking the crank handle of the shaft in a position with the prongs of the link fitting over the cap and engaging the holes in the bracket.

ALFRED MINER.